(12) United States Patent
Murakami

(10) Patent No.: US 9,141,142 B2
(45) Date of Patent: Sep. 22, 2015

(54) MOBILE PERSONAL COMPUTER AND ELECTRONIC DEVICE

(75) Inventor: Mitsuhiro Murakami, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 484 days.

(21) Appl. No.: 13/596,812

(22) Filed: Aug. 28, 2012

(65) Prior Publication Data

US 2012/0320515 A1 Dec. 20, 2012

Related U.S. Application Data

(63) Continuation of application No. 13/115,847, filed on May 25, 2011, now abandoned.

(30) Foreign Application Priority Data

Jun. 18, 2010 (JP) .................................. 2010-139820

(51) Int. Cl.
*H05K 5/00* (2006.01)
*H01J 17/49* (2012.01)
*G06F 1/16* (2006.01)

(52) U.S. Cl.
CPC ............ *G06F 1/1643* (2013.01); *G06F 1/1616* (2013.01); *G06F 1/1641* (2013.01)

(58) Field of Classification Search
USPC ......... 361/704, 707, 709, 728, 751, 711, 718, 361/719; 165/80.2, 80.3, 185
See application file for complete search history.

(56) References Cited

U.S. PATENT DOCUMENTS

| 5,953,206 | A | 9/1999 | Jondrow | |
| 6,043,977 | A * | 3/2000 | Nakajima | ................ 361/679.48 |
| 6,738,254 | B2 | 5/2004 | Oogami | |
| 7,377,793 | B2 | 5/2008 | Yamauchi | |
| 7,486,501 | B2 | 2/2009 | Hanatsuka et al. | |
| 7,710,728 | B2 | 5/2010 | Arisaka et al. | |
| 2002/0036888 | A1 | 3/2002 | Oogami | |
| 2007/0161287 | A1 | 7/2007 | Yamauchi | |
| 2007/0297124 | A1 | 12/2007 | Hanatsuka et al. | |
| 2008/0259537 | A1 | 10/2008 | Arisaka et al. | |
| 2011/0310549 | A1 | 12/2011 | Murakami | |

FOREIGN PATENT DOCUMENTS

| JP | H05-283872 | 10/1993 |
| JP | H10-079580 | 3/1998 |
| JP | H10-240420 | 9/1998 |
| JP | H11-219236 | 8/1999 |
| JP | 2001-117669 | 4/2001 |

(Continued)

OTHER PUBLICATIONS

Notice of Rejection mailed by the Japan Patent Office on Sep. 27, 2011 in JP Pat App No. 2010-139820 in 5 pages.

(Continued)

*Primary Examiner* — Jerry Wu
(74) *Attorney, Agent, or Firm* — Knobbe, Martens Olson & Bear LLP

(57) ABSTRACT

According to one embodiment, a mobile personal computer includes: a display panel with a display screen; a board assembly including a board and a component mounted on the board; and a housing including an outer housing constituting an outline and an inner housing arranged between the display panel and the board assembly, and houses the board assembly.

11 Claims, 14 Drawing Sheets

(56) References Cited

FOREIGN PATENT DOCUMENTS

| | | |
|---|---|---|
| JP | 2002-091623 | 3/2002 |
| JP | 2002-368435 | 12/2002 |
| JP | 2004-054661 | 2/2004 |
| JP | 2005-093719 | 4/2005 |
| JP | 2007-184206 | 7/2007 |
| JP | 2007-305042 | 11/2007 |
| JP | 2008-090437 | 4/2008 |
| JP | 2009-009536 | 1/2009 |

OTHER PUBLICATIONS

Decision to Grant a Patent mailed by the Japan Patent Office on Jan. 4, 2012 in JP Pat App No. 2010-139820 in 5 pages.

* cited by examiner

MOBILE PERSONAL COMPUTER AND ELECTRONIC DEVICE

CROSS-REFERENCE TO RELATED APPLICATIONS

This application is a continuation of U.S. patent application Ser. No. 13/115,847, filed May 25, 2011, which is based upon and claims the benefit of priority from Japanese Patent Application No. 2010-139820, filed Jun. 18, 2010, the entire contents of each of which are incorporated herein by reference.

FIELD

An embodiment described herein relates generally to a mobile personal computer and an electronic device.

BACKGROUND

Electronic devices including a circuit board housed in housings are known.

It is desired in electronic devices to increase the rigidity of housings while preventing inconveniences.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

In general, according to one embodiment, a mobile personal computer comprises: a display panel with a display screen; a board assembly comprising a board and a component mounted on the board; and a housing comprising an outer housing constituting an outline and an inner housing arranged between the display panel and the board assembly, and houses the board assembly.

According to another embodiment, an electronic device comprises: a display panel with a display screen; a board on which a component is mounted; and a housing configured to support the display panel in a state in which the display screen is exposed on a front face, and to house the board therein. The housing comprises an outer housing constituting an outline and an inner housing arranged between the display panel and the board.

Figure 1:
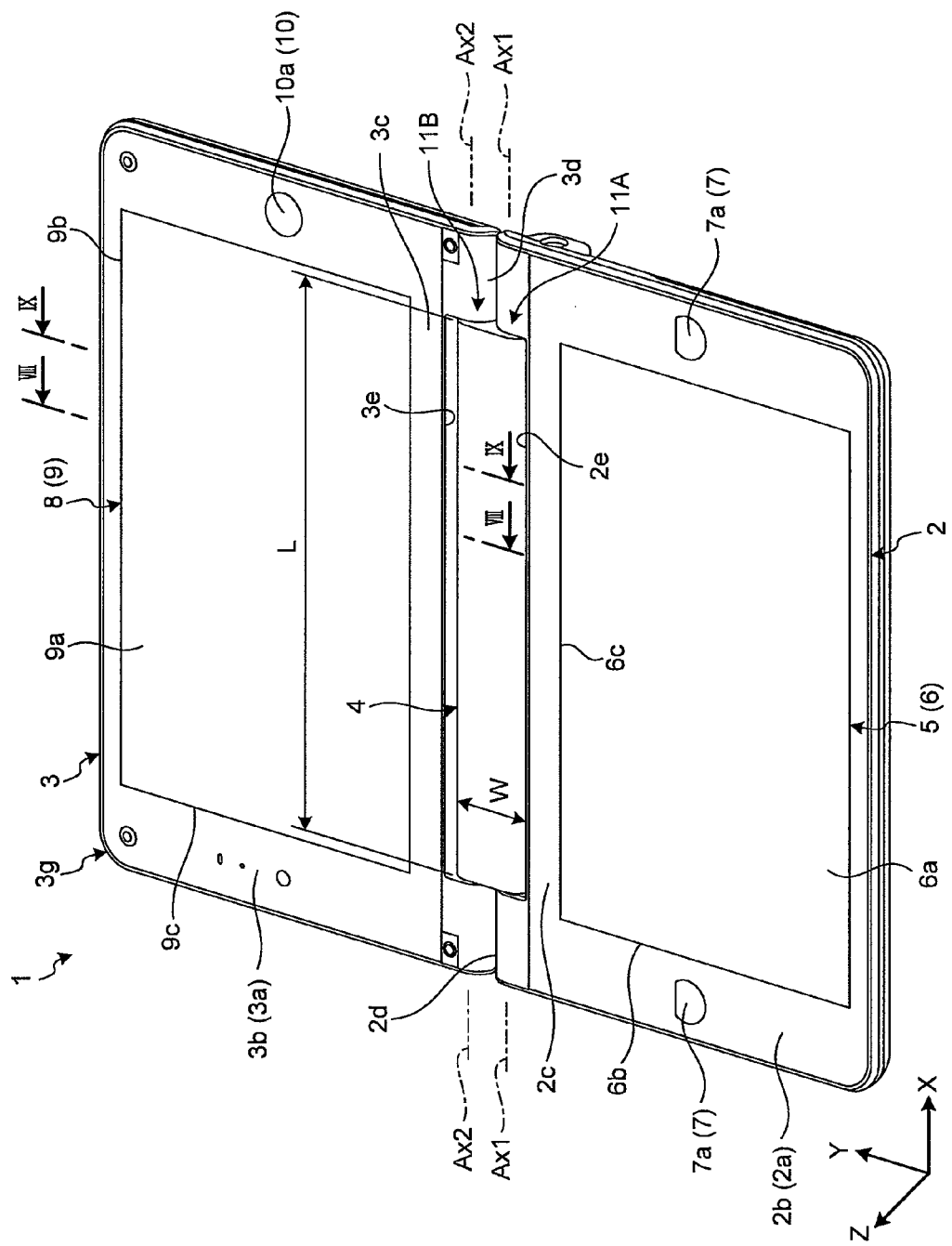
FIG. 1 is a perspective view of a mobile personal computer that is an electronic device according to one embodiment.

A mobile personal computer 1 of a so-called notebook type that is an electronic device according to one embodiment comprises a rectangular and flat first body 2 and a rectangular and flat second body 3 as illustrated in FIG. 1. The first body 2 and the second body 3 are connected via a joint portion 4 in a manner that the first body 2 and the second body 3 can pivot relative to each other.

The first body 2 is provided with a display panel 6 such as a liquid crystal display (LCD) that is a display unit having a touch panel 5 arranged on a front face (display screen 6a) thereof, and a push button mechanism 7, which are exposed on a front face 2b that is an outer face of a housing 2a. On the other hand, the second body 3 is provided with a display panel 9 such as a LCD that is a display unit having a touch panel 8 arranged on a front face (display screen 9a) thereof, and a push button mechanism 10, which are exposed on a front face 3b that is an outer face of a housing 3a. In the embodiment, the width direction (lateral direction) of the second body 3 is referred to as an X direction, the direction toward a leading end of the second body 3 is referred to as a Y direction, and the thickness direction of the second body 3 is referred to as a Z direction for convenience. The X-axis, Y-axis and Z-axis are perpendicular to one another.

In an unfolded state as illustrated in FIG. 1, the display panels 6, 9 and covers 7a, 10a of the push button mechanisms 7, 10 are exposed to be in a state usable by a user. On the other hand, in a folded state which is not illustrated, the front faces 2b, 3b are opposed close to each other and the display panels 6, 9 and the covers 7a, 10a of the push button mechanisms 7, 10 are in a state hidden by the housings 2a, 3a. In the embodiment, the touch panels 5, 8, the push button mechanisms 7, 10 and a microphone (not illustrated) correspond to an input operating section, while display panels 6, 9 and a speaker (not illustrated) correspond to an output section. In a mobile personal computer having a keyboard, a click button, a pointing device or the like (not illustrated), the keyboard, the click button and so on also constitute the input operating section.

The joint portion 4 is a part that connects the first body 2 and the second body 3, and is formed as a separate part from the first body 2 and the second body 3. The joint portion 4 connects an end 2c of the first body 2 and an end 3c of the second body 3 on the base end side. In central portions in the longitudinal direction of edges 2d, 3d of the ends 2c, 3c, rectangular notches 2e, 3e having a long opening width in the longitudinal direction and a short depth are formed. A half of the joint portion 4 is inserted in one notch 2e and the other half thereof is inserted in the other notch 3e. The length L of the joint portion 4 is slightly smaller than the width of the notches 2e, 3e. The width W of the joint portion 4 is substantially the same as the total thickness of the first body 2 and the second body 3 in the folded state where one body lies on the other.

The first body 2 and the joint portion 4 are connected via a first hinge mechanism 11A in a manner that the first body 2 and the joint portion 4 can pivot relative to each other around a pivoting axis Ax1, and the second body 3 and the joint portion 4 are connected via a second hinge mechanism 11B in a manner that the second body 3 and the joint portion 4 can pivot relative to each other around a pivoting axis Ax2. The pivoting axis Ax1 and the pivoting axis Ax2 are parallel to each other. In the embodiment, the first hinge mechanism 11A and the second hinge mechanism 11B are in cooperation with each other, and a relative pivoting angle of the first body 2 with respect to the joint portion 4 around the pivoting axis Ax1 is the same as a relative pivoting angle of the second body 3 with respect to the joint portion 4 around the pivoting axis Ax2. However, the relative pivoting directions of the first body 2 and the second body 3 with respect to the joint portion 4 are opposite to each other. Accordingly, if a user opens one of the first body 2 and the second body 3 with respect to the joint portion 4, the mobile personal computer 1 becomes the unfolded state, while if a user closes one of the bodies, the mobile personal computer 1 becomes the folded state. Further, if a user operates to open the first body 2 and the second body 3, the mobile personal computer 1 becomes the unfolded state, while if a user operates to close the bodies, the mobile personal computer 1 becomes the folded state.

Figure 2:
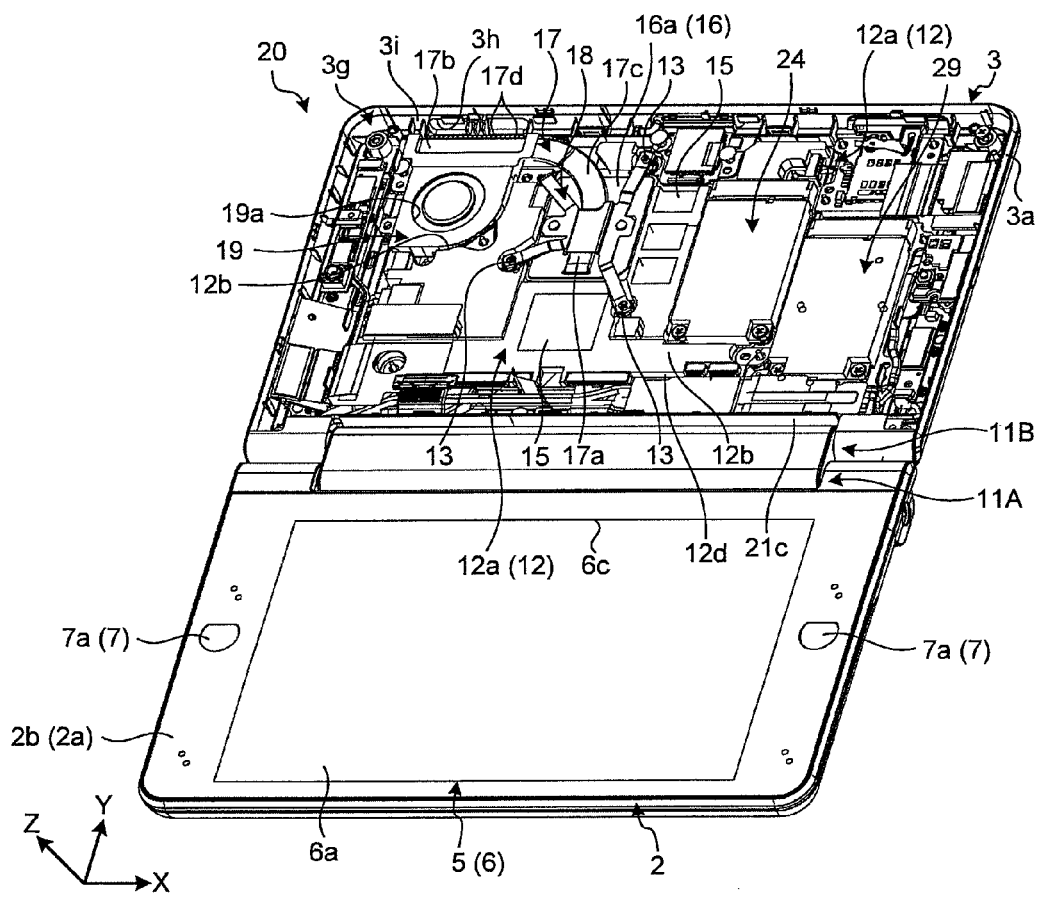
FIG. 2 is a view illustrating a state in which a display panel of a second body is removed from the state of FIG. 1 to expose an inside of the second body, in the embodiment.
Figure 3:
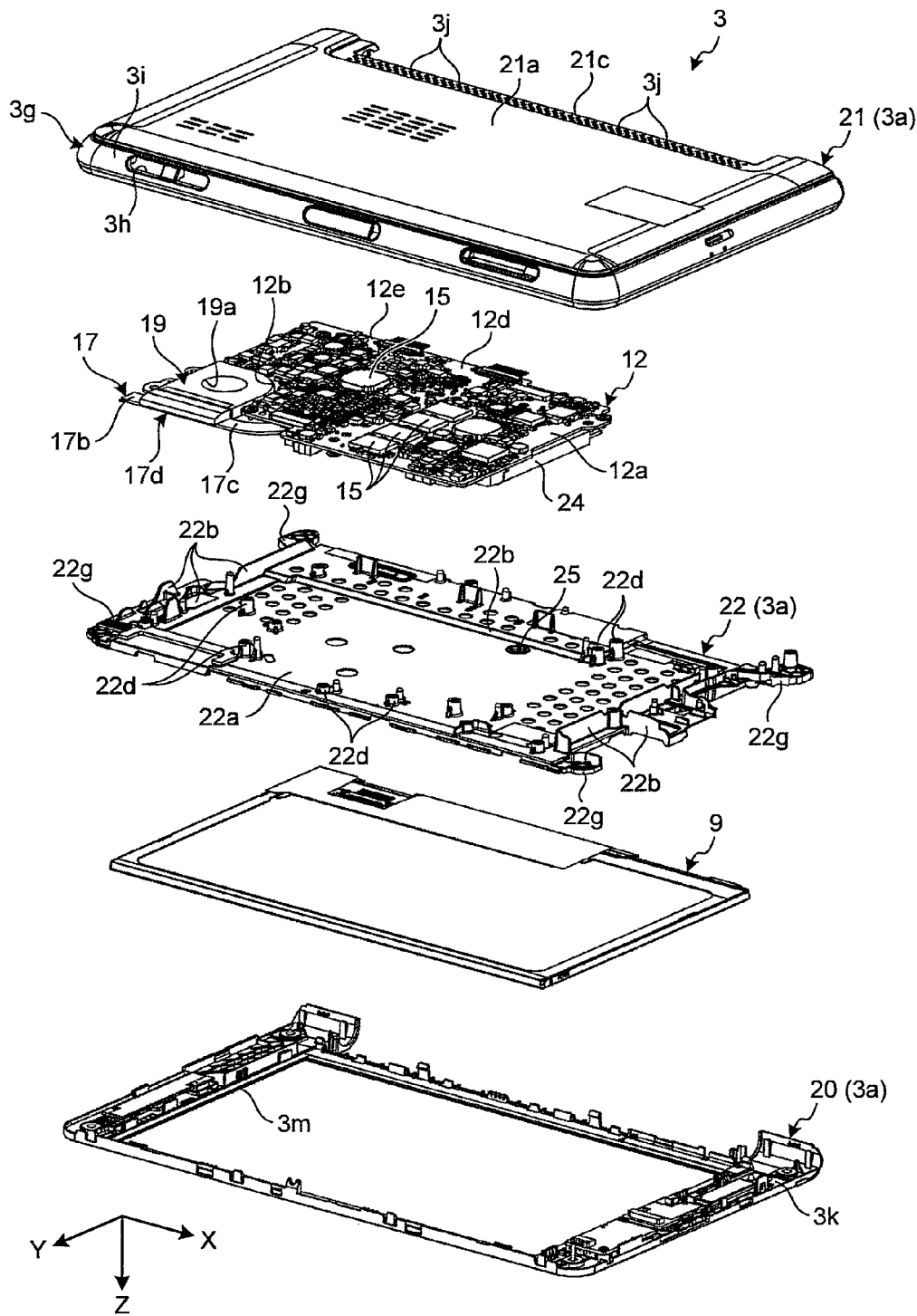
FIG. 3 is an exploded perspective view of the second body of the mobile personal computer in the embodiment.
Figure 4:
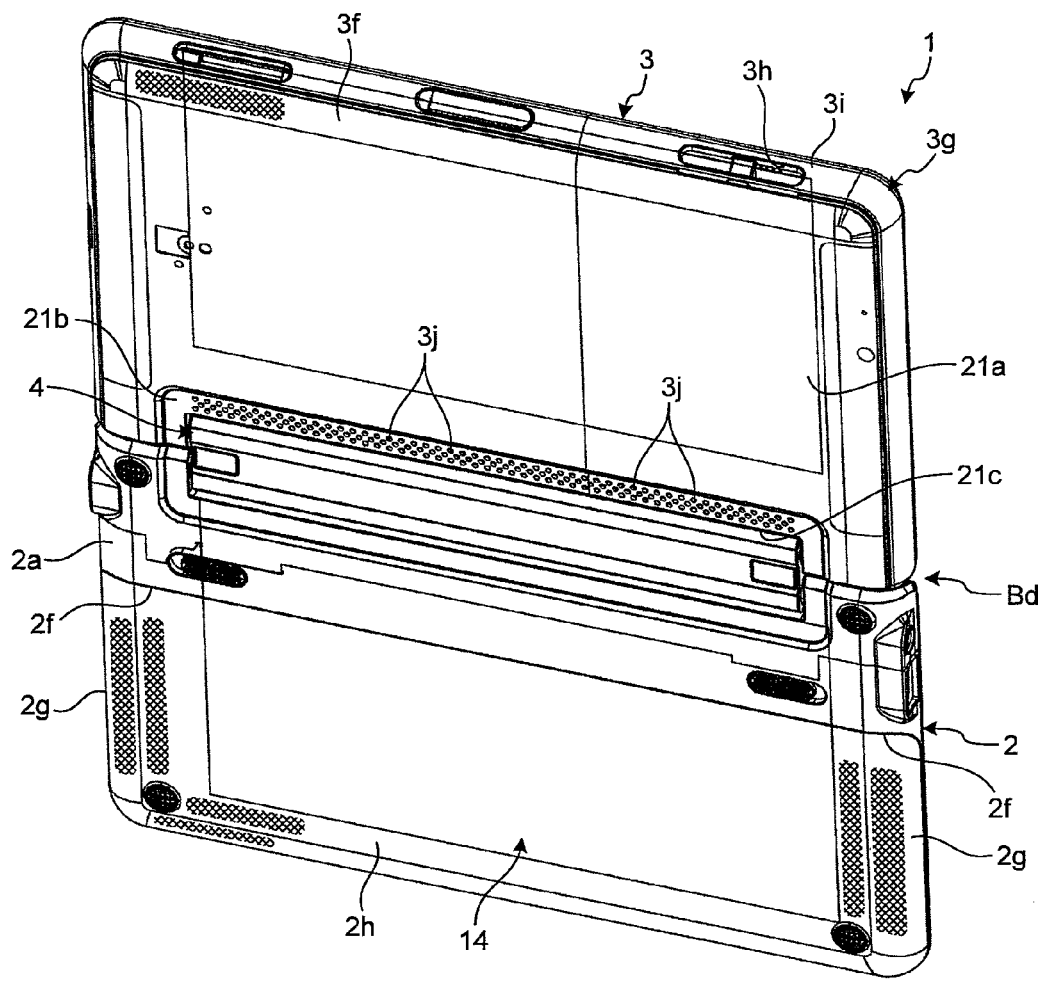
FIG. 4 is a perspective view of the mobile personal computer as viewed from the back thereof, in the embodiment.

In the embodiment, a board 12a (board assembly 12), on which at least a part of control circuits comprising electronic components 15 is mounted, is arranged in the housing 3a of the second body 3, for example, as illustrated in FIGS. 2 and 3. The board 12a and components such as the electronic components 15 mounted on the board 12a constitute the board assembly 12. The board 12a is fixed on the housing 3a with screws 13 (see FIG. 8) that are fixing members. In the first body 2, on the other hand, a battery 14 that is a device power supply on a back face side (rear face side) of the display panel 6 as illustrated in FIG. 4. The back face of the first body 2 has a recess 2f formed to have a rectangular shape in rear view. The battery 14 is detachably attached in the housing 2a of the first body 2 in a state in which the battery 14 covers the recess 2f. In the embodiment, the board assembly 12, in which the main electronic components 15 such as a CPU 16 are mounted, and the battery 14 are arranged separately in the first body 2 and the second body 3. If the board 12a and the battery 14 are arranged together in one of the first body 2 and the second body 3, disadvantages that the thickness of the body portion is increased or, conversely, that the battery 14 and thus the capacity are more likely to be limited due to the restriction in the thickness, for example, are likely to be caused. In the embodiment, however, since the board 12a and the battery 14 are arranged separately in the first body 2 and the second body 3, such disadvantages can be more easily avoided. It is to be noted that, in the embodiment, the weight of the first body 2 is larger than that of the second body 3 so as to place the mobile personal computer 1 more stably on a desk or the like in a first usage state U1 illustrated in FIG. 5.

Figure 5:
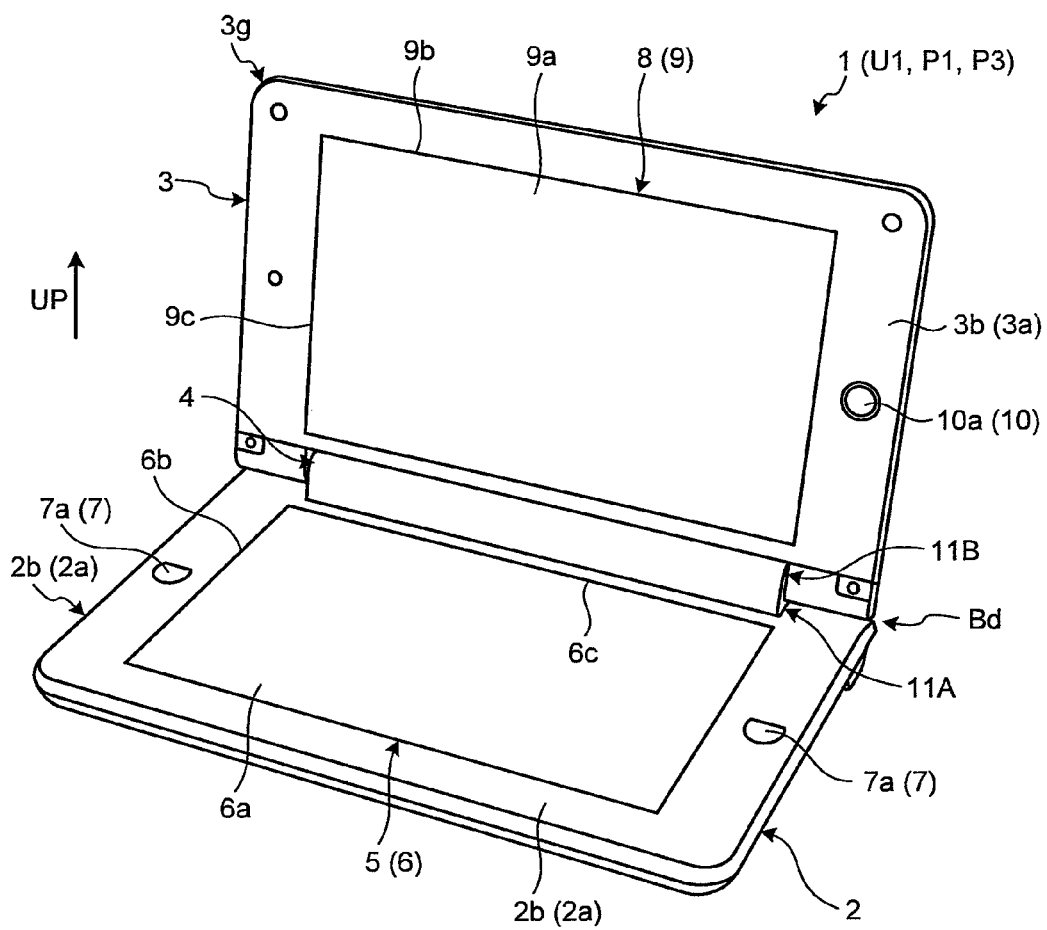
FIG. 5 is a perspective view illustrating a first usage state of the personal computer in the embodiment.
Figure 6:
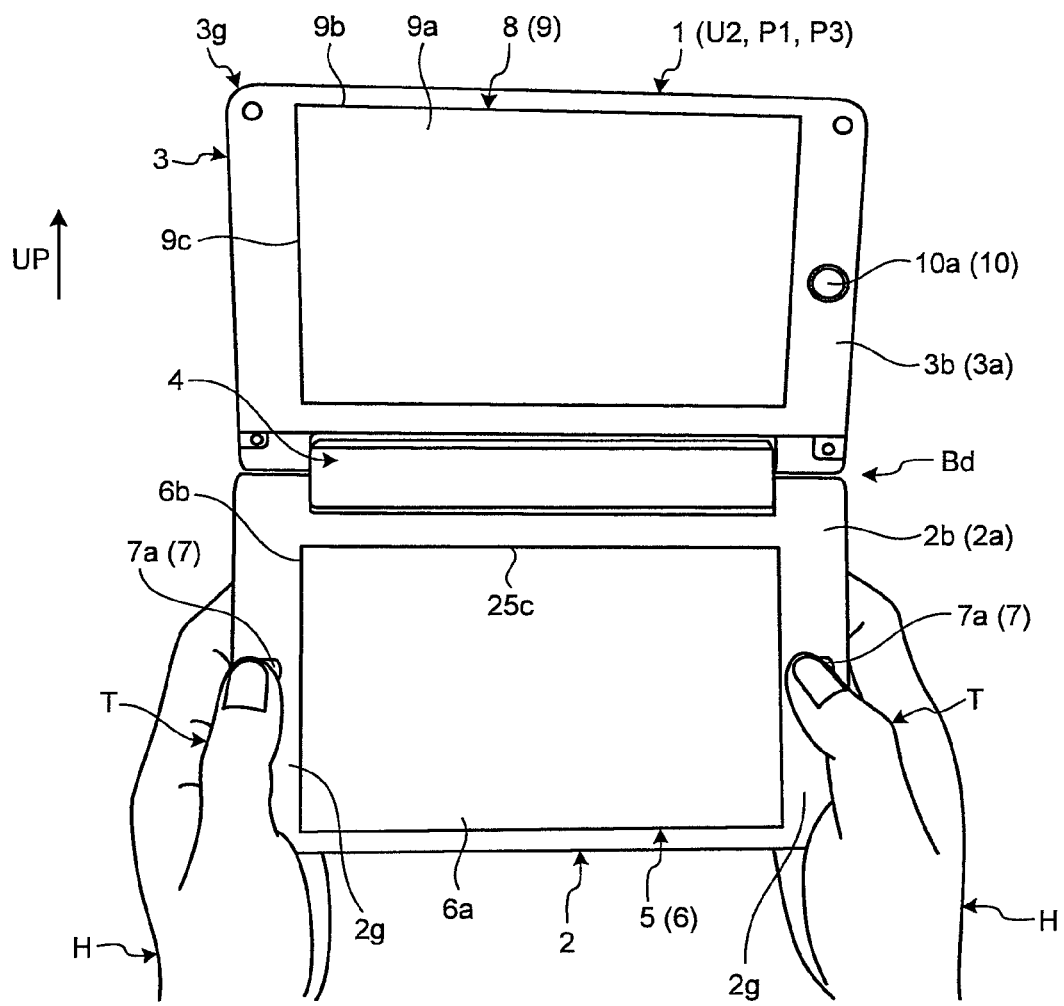
FIG. 6 is a perspective view illustrating a second usage state of the personal computer in the embodiment.
Figure 7:
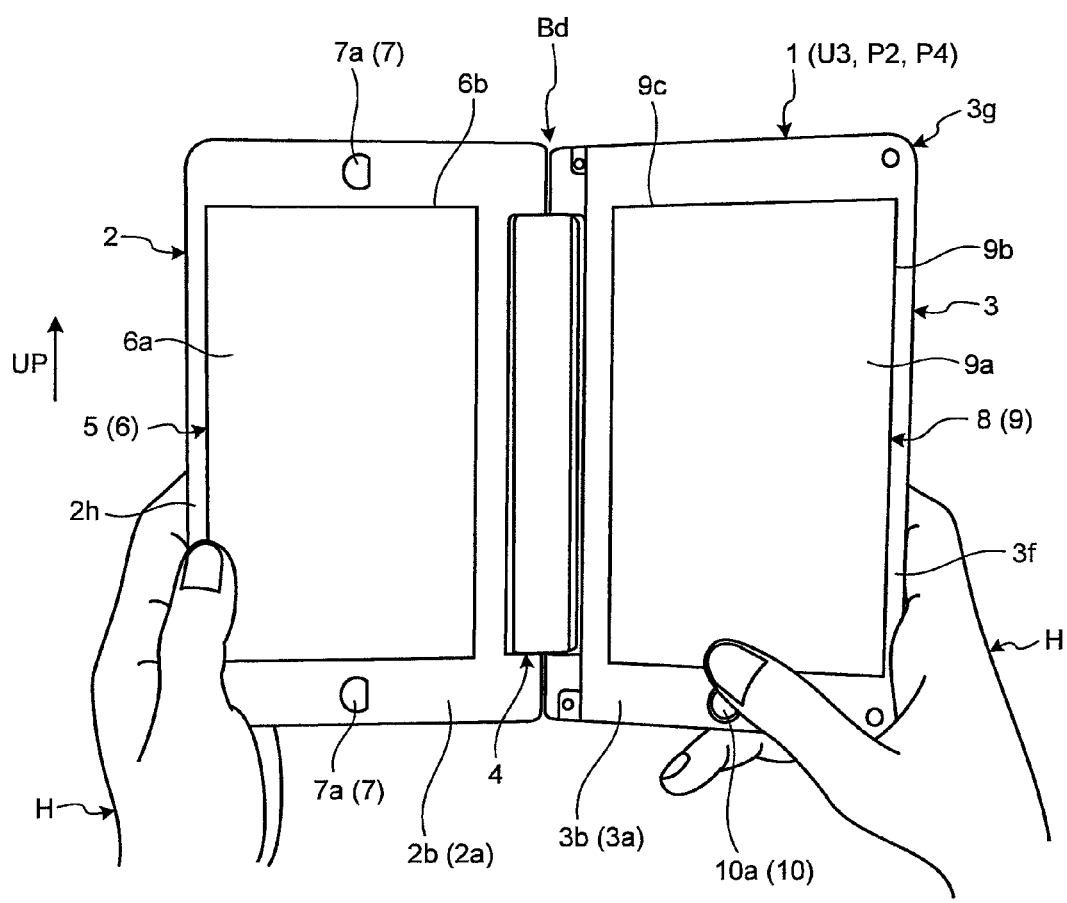
FIG. 7 is a perspective view of a third usage state of the personal computer in the embodiment.

The mobile personal computer 1 according to the embodiment can be also be used in a second usage state U2 illustrated in FIG. 6 and a third usage state U3 illustrated in FIG. 7 in addition to the first usage state U1 illustrated in FIG. 5. The second usage state U2 is a usage state in which the first body 2 and the second body 3 are opened relatively widely and hands H hold side edge portions 2g on both sides on the first body 2 in the width direction as illustrated in FIG. 6. In this usage state, a user can operate the push button mechanism 7 with thumbs T of the hands H holding the first body 2. The third usage state U3 is a usage state in which the first body 2 and the second body 3 are opened relatively widely and hands H hold a side edge portion 2g on one side of the first body 2 in the width direction and a side edge portion 3f on one side of the second body 3 in the width direction as illustrated in FIG. 7. The second usage state U2 is the same as the first usage state U1 in the view provided to a user, but is different from the first usage state U1 in whether the mobile personal computer 1 is used in a state in which it is held by hands H in a standing posture or a sitting posture or in a state in which it is placed on a desk or the like. On the other hand, the usage state U3 is different from the first and second usage states U1 and U2 in that the display screens 6a, 9a of the display panels 6, 9 is rotated by 90°.

Specifically, the mobile personal computer 1 according to the embodiment can be used in a first posture P1 in which a side 9b of the display screen 9a of the display panel 9 is positioned at the top (first and second usage states U1 and U2; see FIGS. 5 and 6) and in a second posture P2 in which another side 9c of the display screen 9a and a side 6b of the display screen 6a are positioned at the top (third usage state U3; see FIG. 7). The side 6b of the display screen 6a is a side away from a boundary portion Bd of the first and second bodies 2 and 3. The side 9c of the display screen 9a and the side 6b of the display screen 6a lie next to each other with the boundary portion Bd therebetween. In the embodiment, the first posture P1 of the display screen 9a corresponds to a third posture P3 of the two display screens 9a, 6a, and the second posture P2 of the display screen 9a corresponds to a fourth posture P4 of the two display screens 9a, 6a.

Each of the display panels 6, 9 is formed in a flat rectangular parallelepiped. The display panels 6, 9 is configured to receive display signals from control circuits (none of which is illustrated) constituted by the electronic components 15 mounted on the board 12a, and display images such as still images and moving images. Also in the embodiment, light producing images displayed on the display screens 6a, 9a of the display panels 6, 9 is emitted forward through the colorless and transparent touch panels 5, 8. The control circuits of the mobile personal computer 1 comprise a control unit, a storage unit (such as a read only memory (ROM), a random access memory (RAM) and a hard disk drive (HDD)), an interface circuit, and various controllers. The mobile personal computer 1 also has a built-in speaker (not illustrated) for audio output.

As illustrated in FIG. 2, the CPU 16 that is a heat generator and the electronic component 15 is mounted on the board 12a. A radiator block 16a is placed on a die (not illustrated) of the CPU 16, and a heat receiving portion 17a of a heat pipe 17 that is a heat transport mechanism is placed on the radiator block 16a. The heat receiving portion 17a is pressed against the radiator block 16a by a pressing member 18 fixed on the board 12a by the screws 13 that are fastening members. With such a structure, heat generated at the CPU 16 that is a heat generator is transmitted to the heat receiving portion 17a via the radiator block 16a.

The heat pipe 17 that is a heat transport mechanism has a tube made of a metal material (such as a copper alloy) having a relatively high heat conductivity and having an oval and flat cross-section, for example. One end of the tube is the heat receiving portion 17a, the other end thereof is a heat radiating portion 17b, and a portion between the heat receiving portion 17a and the heat radiating portion 17b is a heat transfer portion 17c. A plurality of fins 17d made of a thin sheet metal material (such as a copper alloy) having a relatively high heat conductivity is arranged outside the tube of the heat radiating portion 17b. In addition, a fan 19 is arranged at a position in the housing 3a adjacent to the heat radiating portion 17b. The fan 19 has a flat appearance that is thin in the width direction of the board 12a, and comprises a rotor (not illustrated) configured to rotate around a rotary axis along a direction perpendicular to the front and rear faces of the board 12a. The fan 19 exhausts air taken from the inside of the housing 3a through air inlets 19a provided on both sides in the axial direction of the rotary axis (on both the front side and the rear side), for example, through an air outlet 3h opposed to the heat radiating portion 17b by rotating the rotor with an electric motor. Specifically, airflow exhausted from the fan 19 blows to the heat radiating portion 17b and the fins 17d, whereby the heat radiating portion 17b and the fins 17d are cooled. The fan 19 is arranged to be fitted in an L-shaped notch 12b formed at a corner of the board 12a.

Referring to FIGS. 1, 2, 5 to 7, it will be appreciated that the heat receiving portion 17a is positioned lower than the heat radiating portion 17b in both the first posture P1 and the second posture P2 in the embodiment. If the heat pipe 17 that is a heat transport mechanism becomes a so-called top heat state in which the heat receiving portion 17a is positioned upper than the heat radiating portion 17b, a liquefied heat transport medium becomes difficult to flow from the heat radiating portion 17b back to the heat receiving portion 17a. Accordingly, the heat transport efficiency, namely the heat dissipation efficiency is reduced. In the embodiment, however, since the heat receiving portion 17a is positioned lower than the heat radiating portion 17b in both the first posture P1 and the second posture P2 that are defined as correct postures, it is possible to prevent reduction of the heat transport efficiency, namely the heat dissipation efficiency, caused by positioning the heat receiving portion 17a upper than the heat radiating portion 17b. In addition, in the first posture P1 and the second posture P2, the control unit can make a user aware of the posture by displaying an image in an orientation corresponding to each posture P1 or P2 on the display screens 6a, 9a based on a detection result of a posture sensor (not illustrated) arranged in the housing 3a of the second body 3. Further, by providing posture representing elements such as concaves and convexes or display elements on at least one of the first body 2 and the second body 3, it is possible to make a user aware of the first posture P1 and the second posture P2.

The heat radiating portion 17b is arranged at a corner 3g of the housing 3a, which is a top end in the first posture P1 (FIGS. 5 and 6) and in the second posture P2 (FIG. 7) as illustrated in FIG. 2. Inside the housing 3a, heat is likely to flow upward due to the airflow. Therefore, by arranging the heat radiating portion 17b at the corner 3g of the housing 3a, which is the top end in the first posture P1 and the second posture P2, heat is less likely to remain inside the housing 3a.

In addition, as illustrated in FIGS. 2 and 4, the air outlet 3h is formed in a side wall 3i at the corner 3g of the housing 3a in the embodiment. Thus, the airflow, which is blown out from the fan 19 and heated while passing through the heat radiating portion 17b arranged at the corner 3g, is more smoothly exhausted through the air outlet 3h provided at the corner 3g of the housing 3a and closely opposed to the heat radiating portion 17b. Accordingly, heat is less likely to remain inside the housing 3a.

Figure 11:
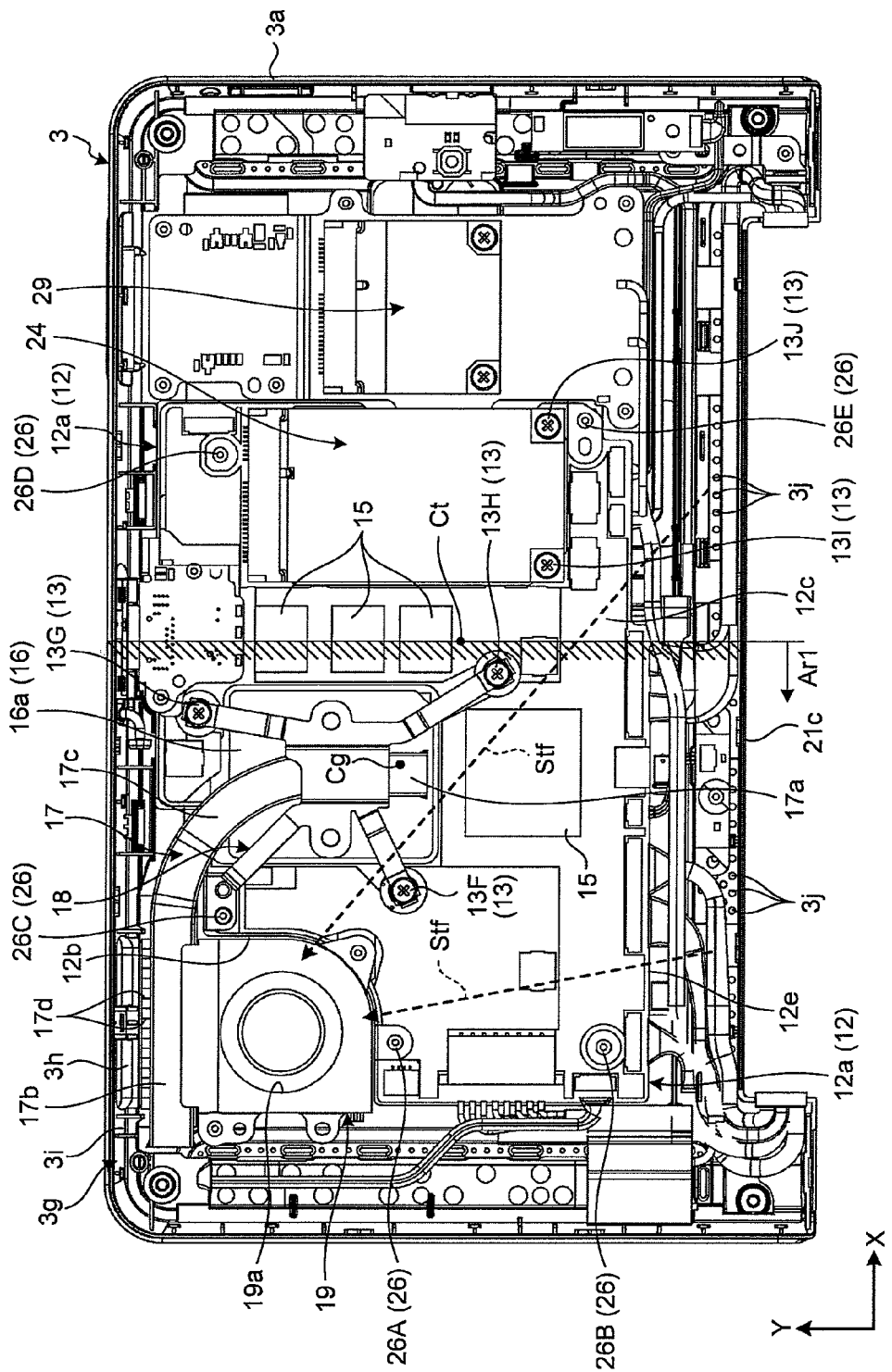
FIG. 11 is a plan view of the inside of the second body of the mobile personal computer in a state in which the display panel of the second body is removed as viewed from the front (front face) thereof, in the embodiment.

In addition, as illustrated in FIGS. 2 and 11, the CPU 16, which is a heat generator, is arranged in a rectangular region Ar1 that comes on an upper side (namely, on the left side in FIG. 11) than a center Ct in the second posture P2 in front view of the display screen 9a (namely, in the view of FIG. 11). Accordingly, the upward airflow generated by the heat of the CPU 16, which is a heat generator, in the housing 3a or the airflow drawn into the fan 19 travels a relatively long distance in the housing 3a, whereby it is possible to prevent the electronic components in a larger area in the housing 3a from being easily affected by the heat. In addition, if it is assumed that the CPU 16, which is a heat generator, is positioned at the center Ct, the heated air may remain in a region opposite to the air outlet 3h across the center Ct in the housing 3a. In the embodiment, however, since the CPU 16, which is a heat generator, is arranged in a region on the side of the air outlet 3h with respect to the center Ct in both the first posture P1 and the second posture P2, the heated air is more easily exhausted outside the housing 3a. In addition, in the embodiment, when a user hold the second body 3 with his/her hand H as illustrated in FIG. 7, the user holds a side opposite to the rectangular region Ar1 across the center Ct with his/her hand H. Therefore, since the user holds with his/her hand H a region of the second body 3 that is away from the CPU 16 and the heat pipe 17, he/she can avoid holding a region that is heated by the heat from the CPU 16 and the heat pipe 17 in the housing 3a. Thus, the user can avoid feeling uncomfortable due to the heated housing 3a when he/she holds the mobile personal computer 1 with his/her hand H.

Figure 8:
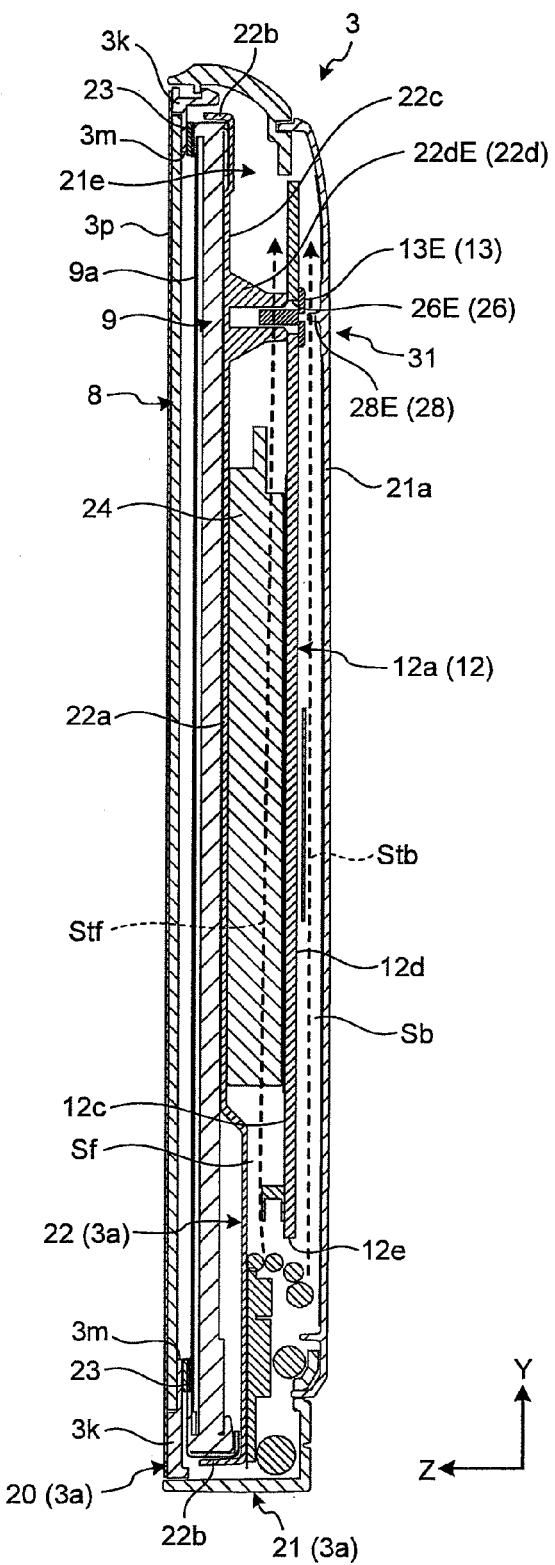
FIG. 8 is a sectional view taken along a line VIII-VIII of FIG. 1, in the embodiment.
Figure 9:
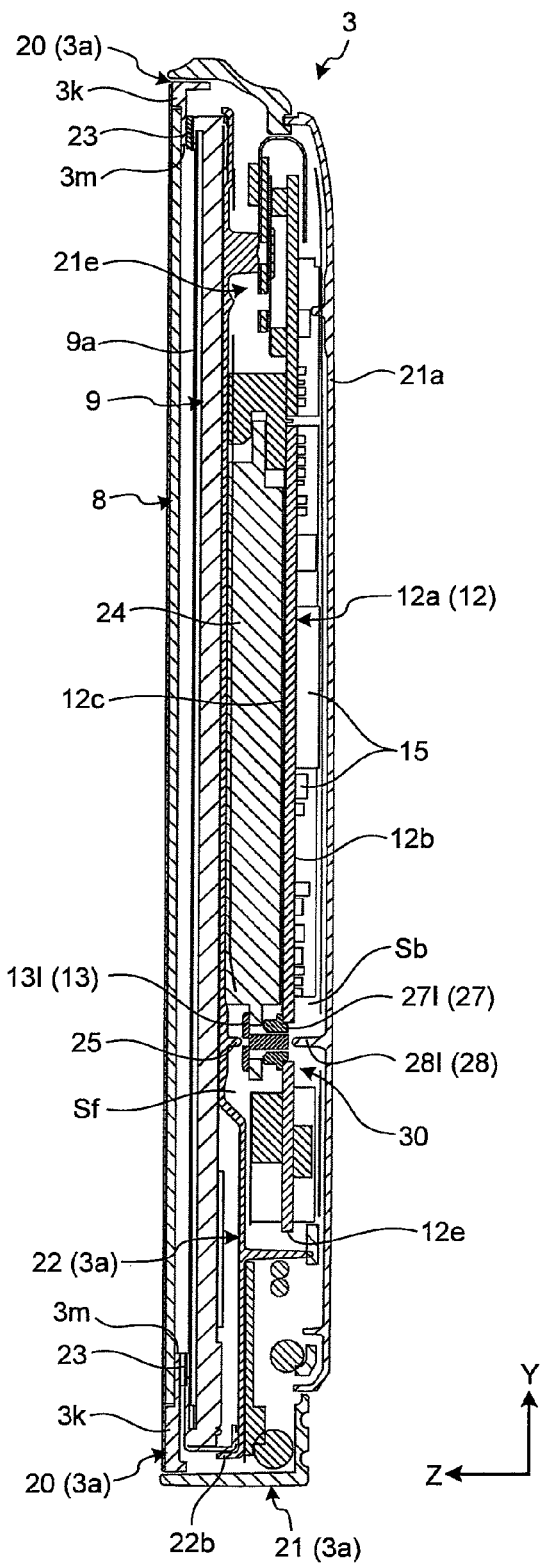
FIG. 9 is a sectional view taken along a line IX-IX of FIG. 1, in the embodiment.

As illustrated in FIG. 3, the housing 3a of the second body 3 comprises a mask 20 and a case 21, which constitute an outer housing, and an inner plate 22, which is an inner housing. The mask 20 and the case 21, which constitute an outer housing, are integrated with each other by screwing, engagement or fitting, and constitute an outline of the housing 3a. The inner plate 22 that is an inner housing is fixed to the mask 20 or the case 21 (the case 21, for example) that is an outer housing by screwing or the like. The housing 3a is configured to house the display panel 9 in a manner that the display screen 9a thereof is exposed on the front face, and also house the board 12a. The inner plate 22 is arranged at a position between the display panel 9 and the board 12a, namely at the back of the display panel 9 and in front of the board 12a. The board 12a is fixed to the inner plate 22 with the screws 13 that are fixing members. In the embodiment, the display panel 9 is held between the inner plate 22 and the case 21 with an elastic buffer material 23 interposed as illustrated in FIGS. 8 and 9. As illustrated in FIG. 3, a plurality of ribs 22b (see FIG. 3) that holds the display panel 9 therebetween in the X direction and the Y direction is provided on the inner plate 22. The display panel 9 is held between the ribs 22b with an elastic buffer material (not illustrated) interposed. Alternatively, the display panel 9 may be attached to the housing 3a by screwing, engagement or fitting.

The mask 20 constitutes a front wall 3k that form the front face 3b of the housing 3a. The mask 20 is formed in a rectangular frame extending along the circumferential edge of the display panel 9, and has a rectangular opening 3m for exposing the display screen 9a of the display panel 9 in the center thereof. The mask 20 can also be used as a base for attaching components such as a board and an antenna inside the housing 3a. The mask 20 may be formed of a metal material, a synthetic resin material, or the like. The display panel 9 is formed in a flat shape that is rectangular in front view and thin in the thickness direction (Z direction).

The touch panel 8 is arranged to cover the opening 3m of the mask 20 as illustrated in FIGS. 8 and 9. The front faces of the touch panel 8 and the mask 20 are bonded to a transparent cover 3p made of a synthetic resin material or the like formed in a thin sheet, a film, or a plate with a double-sided tape (not illustrated) or an adhesive. The touch panel 8 and the mask 20 are integrated via the cover 3p.

Figure 10:
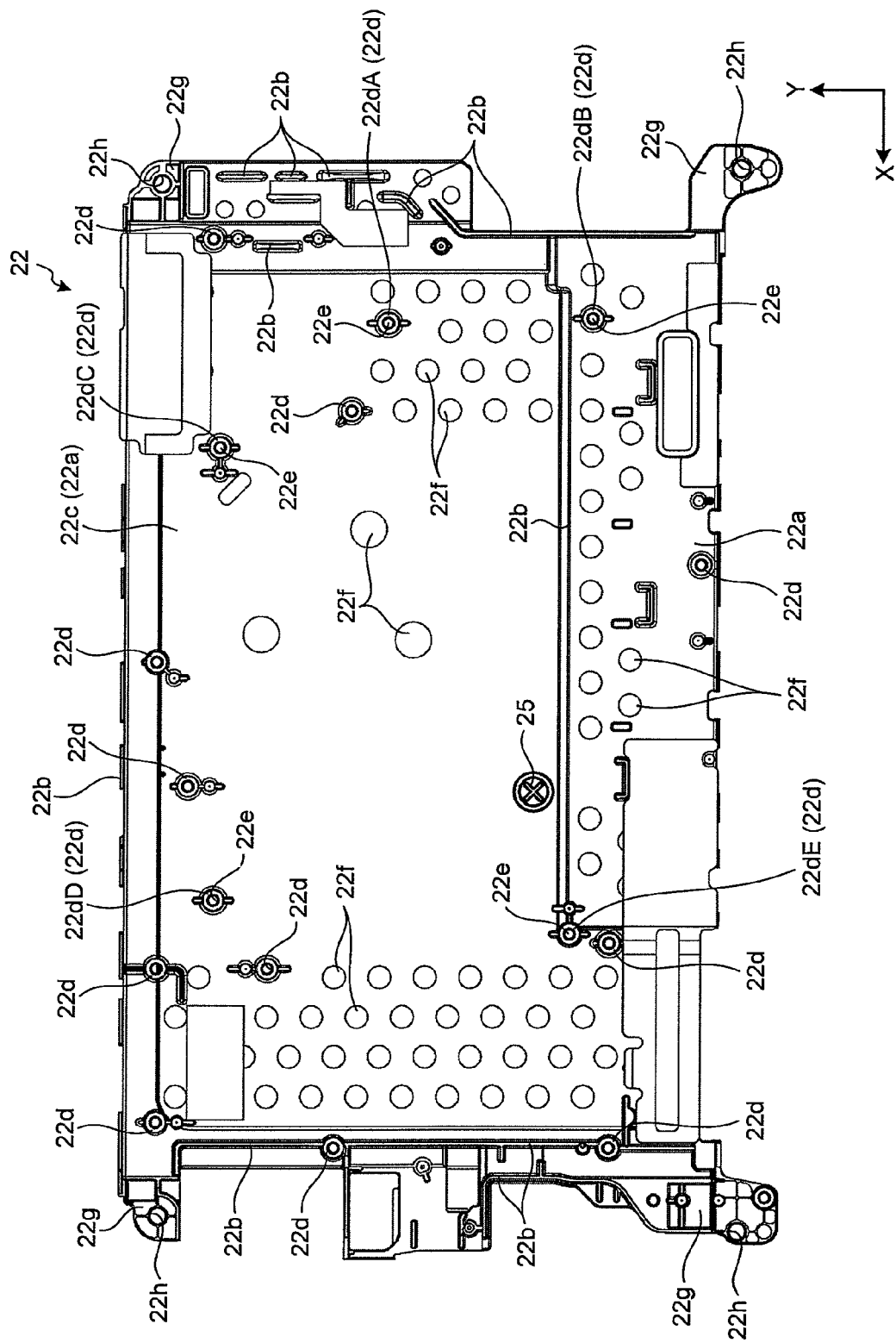
FIG. 10 is a plan view of an inner plate that is an inner housing of the second body of the mobile personal computer as viewed from the back (rear face), in the embodiment.

The inner plate 22 has a plate-like partition wall 22a that is rectangular in plan view as illustrated in FIGS. 3 and 10. A plurality of wall-like ribs 22b, for example, is provided on the partition wall 22a so as to improve the rigidity. On a back face 22c of the partition wall 22a, a plurality of bosses 22d that protrudes toward the board 12a at the back are provided. The bosses 22d each comprises an internal thread hole 22e formed therein. The screws 13 are fixed in the bosses 22d, whereby the board 12a and other components (such as the fan 19 and a solid state drive (SSD) 29) are fixed to the inner plate 22. The partition wall 22a also comprises a plurality of through-holes 22f formed therein. The through-holes 22f contribute to reduction in weight and improvement in air permeability.

Brackets 22g protrude laterally (in a direction along a XY plane) from the corners of the partition wall 22a. The brackets 22g can be formed in an arm-shape, a tongue-shape or a flange-shape, for example. Further, through-holes 22h through which the screws 13 that fix the inner plate 22, which is an inner housing, to the case 21, which is an outer housing, are inserted are formed in the corners or the tips of the brackets 22g. Thus, in the embodiment, the partition wall 22a on which the board 12a and the components are attached is supported by the case 21 via the plurality of brackets 22g. Accordingly, if an external force is applied to the partition wall 22a from the side of the case 21 or if an inertial force acts on the partition wall 22a, the brackets 22g are elastically deformed, whereby it is possible to suppress the influence of the external force or the inertial force on the partition wall 22a and therefore the board 12a and the components.

In addition, a protrusion 25 that protrudes toward a front face 12c that is a surface of the board 12a is provided on the back face 22c of the partition wall 22a. In the embodiment, the protrusion 25 corresponds to a second protrusion.

Figure 12:
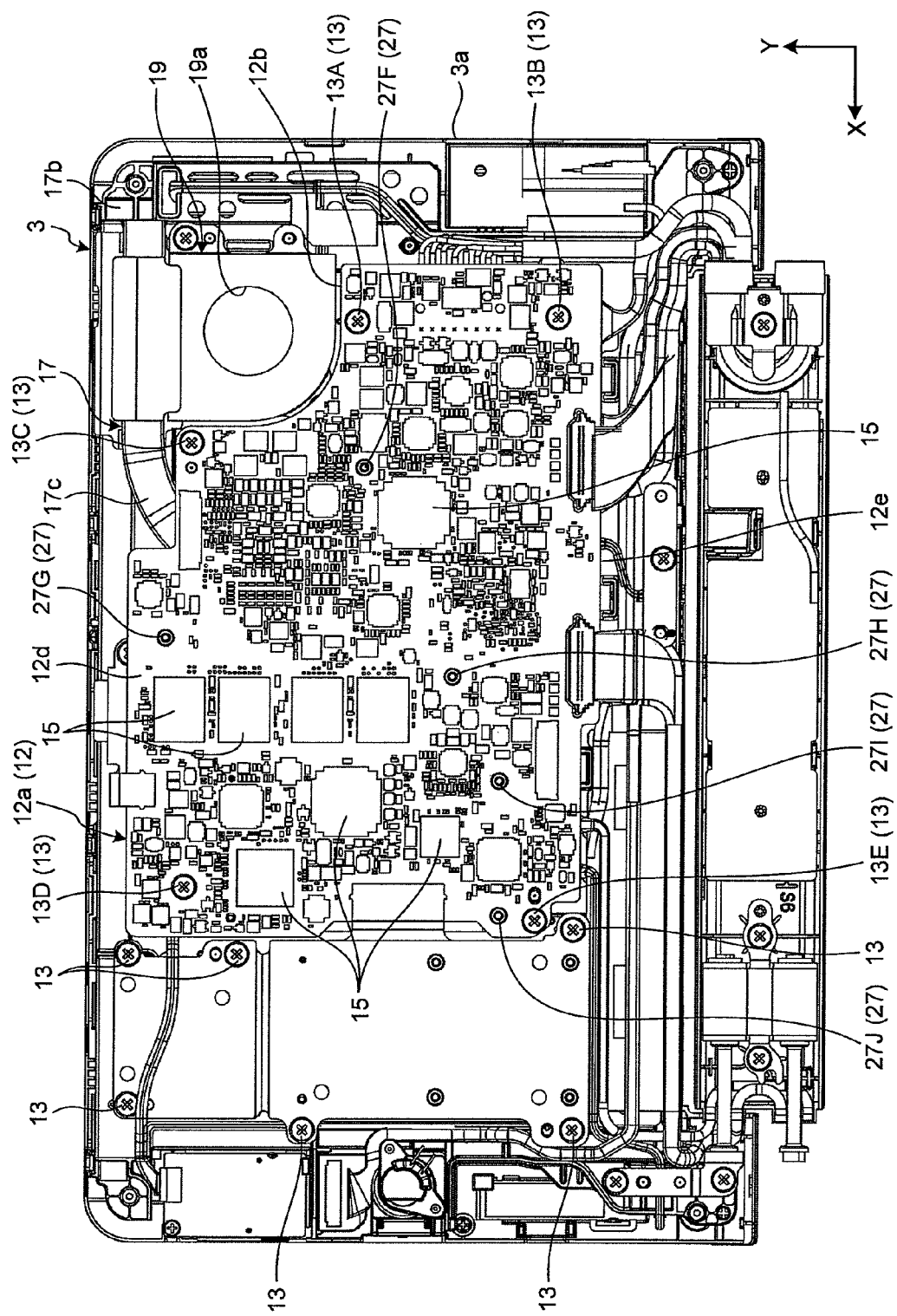
FIG. 12 is a plan view of the inside of the second body of the mobile personal computer in a state in which a case of the second body is removed as viewed from the back (rear face) thereof, in the embodiment.

The board 12a is formed in a rectangular shape as a whole except for a portion where the notch 12b in which the fan 19 is accommodated as illustrated in FIGS. 11 and 12. In the embodiment, a number of electronic components 15 are mounted on both the front face 12c and a back face (rear face) 12d of the board 12a. In the embodiment, relatively taller electronic components 15 are mounted on the front face 12c and relatively shorter electronic components 15 are mounted on the back face 12d. It is thus possible to prevent the height (thickness) of the board structure comprising the board 12a and the electronic components 15 from being larger as compared to a case where the tall electronic components 15 are mounted on both the front face 12c and the back face 12d.

In the embodiment, a SSD 24 that is a relatively tall (relatively thick) electronic component 15 having a relatively large mounting area is arranged on the front face 12c of the board 12a. The SSD 24 is arranged like a wall as illustrated in FIGS. 8 and 9 in a space Sf between the front face 12c of the board 12a and the inner plate 22 on a side (right side in FIGS. 2 and 11) opposite to a side (left side in FIGS. 2 and 11) where the CPU 16 and the fan 19 are arranged as illustrated in FIGS. 2 and 11. Accordingly, in the embodiment, the SSD 24 is arranged away from the CPU 16 and the fan 19 on the side opposite thereto so as to make the space Sf toward the CPU 16 and the fan 19 from the SSD 24 larger, and thereby to increase the amount of airflow flowing through the space Sf.

Figure 13:
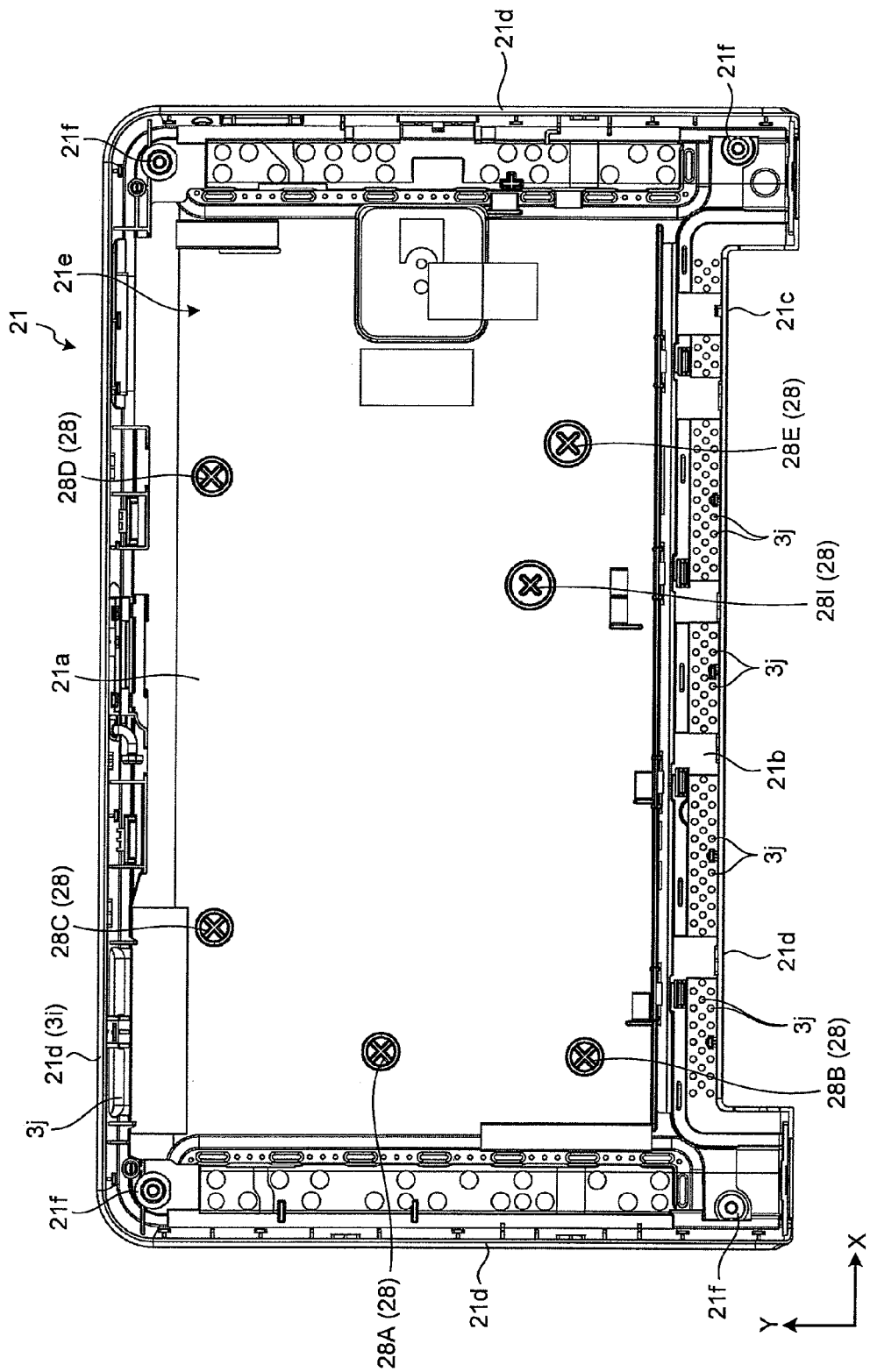
FIG. 13 is a plan view of the case of the second body of the mobile personal computer as viewed from the front (front face) thereof, in the embodiment.

As illustrated in FIGS. 4, 11 and 13, an air inlet 3j is provided in an end 21b on the base end side of a bottom wall 21a of the case 21. In the embodiment, the air inlet 3j is formed as a collection of a plurality of (a number of) small holes through the bottom wall 21a. The air inlet 3j (namely, the region where small holes are formed) is provided in a relatively elongated region along an edge 21c. In a state where the second body 3 is assembled, an edge 12e on the base end side (on the hinge mechanism side) of the board 12a is arranged away from the edge 21c of the case 21. Accordingly, an introduction portion of an airflow flowing from the air inlet 3j, which is provided in the bottom wall 21a of the case 21 on a lateral side (laterally outside; the lower side in FIG. 11) of the edge 12e toward the space Sf between the front face 12c of the board 12a and the inner plate 22 is formed in the housing 3a. Further, the SSD 24 is arranged away from the edge 12e on the front face 12c of the board 12a. Accordingly, airflow Stf that is shown by a dashed arrow in FIG. 11 and flows from the air inlet 3j to the air outlet 3h is generated in the space Sf between the front face 12c of the board 12a and the inner plate 22. As illustrated in FIG. 8, airflow Stb that is shown by a dashed arrow and flows from the air inlet 3j to the air outlet 3h is also generated in a space Sb between the back face 12d of the board 12a and the bottom wall 21a of the case 21.

As illustrated in FIGS. 11 and 12, through-holes 26 (26A to 26E) into which screws 13 (13A to 13E) fixed to the bosses 22d of the inner plate 22 are inserted are formed in the board 12a. The through-holes 26A to 26E are formed in the circumferential edge portion of the board 12a in view of the mounting efficiency of the electronic components 15 on the board 12a. Additional capital letters at the end of reference numerals provided below are identifiers of combinations of corresponding components.

The board 12a is also provided with studs 27 (27F to 27J) that are component-to-be-fixed joined with the screws 13 (13F to 13J) that are fixing members for fixing components. In the embodiment, the pressing member 18 and the SSD 24 are attached to the studs 27 with the screws 13. The studs 27 (27I, 27J) for the SSD 24 are provided in a manner embedded in the board 12a, and the studs 27 (27F to 27H) for the pressing member 18 are provided in a manner protruding from the front face 12c of the board 12a.

Figure 14:
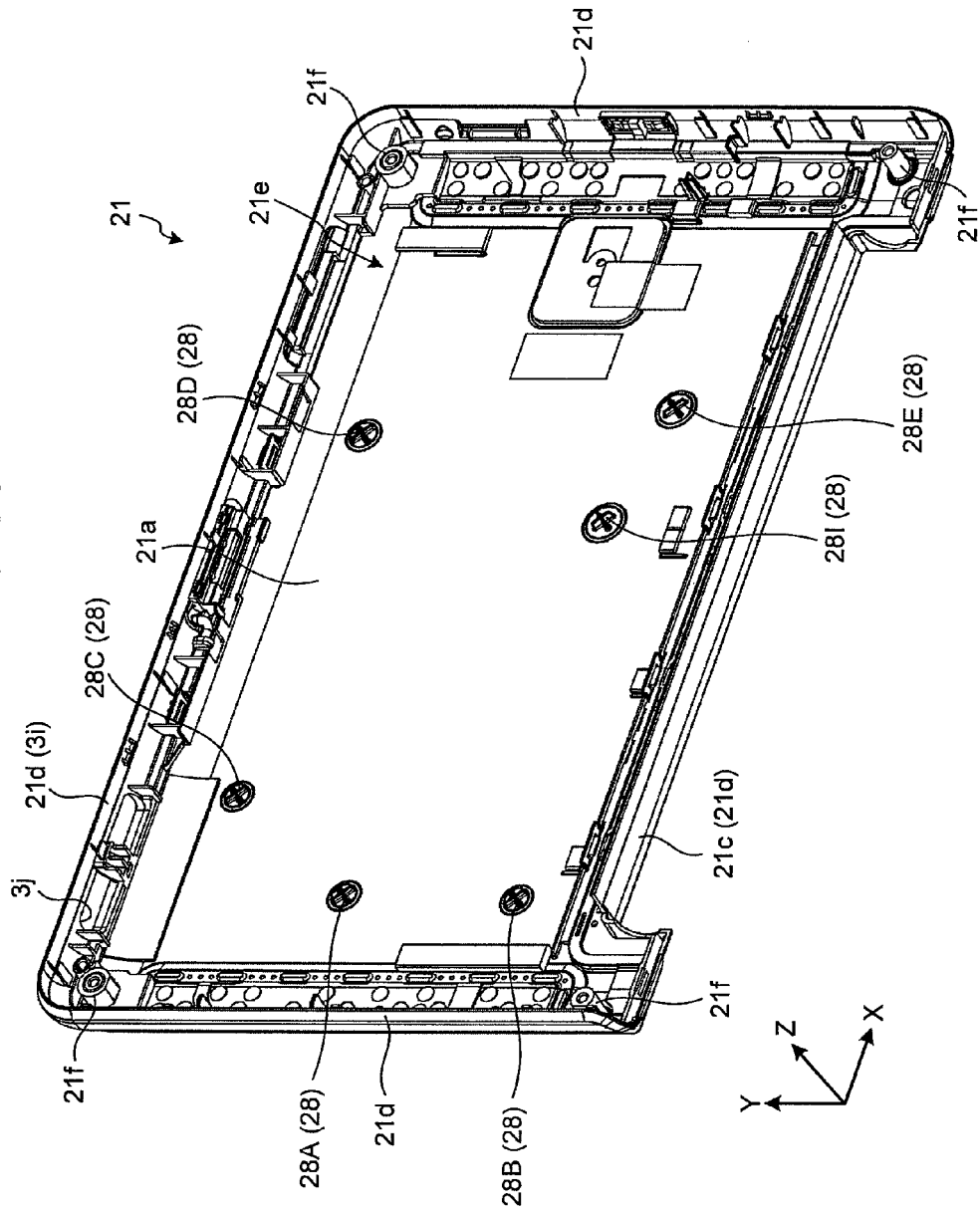
FIG. 14 is a perspective view of the case that is an outer housing of the second body of the mobile personal computer as viewed from the front (front face) thereof, in the embodiment.

The case 21 that is an outer housing comprises the bottom wall 21a formed in a rectangular shape in plan view (in front view) as viewed from the front and a side wall 21d arranged around the bottom wall 21a, and a recess 21e surrounded by the bottom wall 21a and the side wall 21d is formed in the case 21 as illustrated in FIGS. 13 and 14. The recess 21e accommodates the board 12a, the inner plate 22, the fan 19 and the SSD 29.

At the corners in the recess 21e of the case 21, bosses 21f that are board fixing members for fixing the inner plate 22 that is an inner housing the screws 13 that are fixing members are provided. The corners of the case 21 are portions that are near the bottom wall 21a and the side wall 21d and have relatively high rigidity. The corners are also portions whose rigidity can be easily increased by providing ribs or the like. Thus, by providing bosses 21f, which support the inner plate 22 on which the board 12a is fixed, at the corners of the case 21 having higher rigidity, it is possible to further easily suppress the influence of the external force acting on the case 21 on the inner plate 22 and therefore on the board 12a.

The bottom wall 21a of the case 21 is provided with a plurality of protrusions 28 (28A to 28E, 28I) protruding toward the back face 12d of the board 12a. The protrusions 28A to 28E out of the protrusions 28 are opposed to the screws 13A to 13E (see FIG. 12) that are fixing members for fixing the board 12a to the bosses 22dA to 22dE of the inner plate 22 that is an inner housing in an assembled state. FIG. 8 includes a cross-section of structures of the protrusion 28E, the screw 13E and the boss 22dE out of the protrusions 28A to 28E, the screws 13A to 13E and the bosses 22dA to 22dE (see FIG. 10). As illustrated in FIG. 8, the protrusion 28E and the screw 13E are opposed to each other with a gap therebetween in the free state in the embodiment. The protrusion 28E and the screw 13E may be structured to be in contact with each other in the free state, but it is preferable to provide a gap therebetween in the free state in terms of suppressing accumulation of manufacturing errors and abnormal noises. The structures of the other protrusions 28A to 28D, the other screws 13A to 13D and the other bosses 22dA to 22dD that are not illustrated in FIG. 8 are similar to those of the protrusion 28E, the screw 13E and the boss 22dE illustrated in FIG. 8. The protrusions 28A to 28E are each structured in a columnar shape having a cross-shaped cross-section as illustrated in FIGS. 13 and 14.

With such structures, if the bottom wall 21a of the case 21 that is an outer housing bends toward the inside of the housing 3a (upward in FIG. 8) as a result of being pressed by fingers of a user, the protrusions 28A to 28E come in contact with the opposed screws 13A to 13E, respectively, and thereby the bottom wall 21a is prevented from bending further. Thus, in the embodiment, the bending of the case 21 that is an outer housing can be suppressed by a relatively simple structure in which the protrusions 28A to 28E are provided to be opposed to the screws 13A to 13E, respectively. Therefore, according to the embodiment, the housing 3a is less easily deformed due to the external force applied toward the inside of the housing 3a. If the thickness of the case 21 is increased or the case 21 is reinforced, for example, in order to suppress the bending of the case 21 by increasing the rigidity, disadvantages may be caused such as an increase in weight of the case 21 and an increase in trouble in the manufacture. In the embodiment, however, the structures that can suppress the bending of the case 21 can be achieved without increasing so much weight and trouble in the manufacture. In the embodiment, the protrusions 28A to 28E correspond to third protrusions. In the embodiment, corresponding ones of the protrusions 28A to 28E, the screws 13A to 13E and the bosses 22dA to 22dE constitute a second displacement controlling mechanism 31 (see FIG. 8).

The protrusion 28I is opposed to the stud 27I (see FIG. 12) provided in the board 12a or to an end of the screw 13I fixed to the stud 27I in the assembled state. The screw 13I, which is a fixing member for fixing the SSD 24 that is a component to the board 12a, is attached to the stud 27I. The protrusion 25 (see FIG. 10) is arranged on the inner plate 22 at a position opposite to the protrusion 28I with respect to the stud 27I. The protrusion 25 is opposed to the head of the screw 13I (see FIG. 11) in the assembled state. The protrusion 28I and the protrusion 25 each have a columnar shape having a cross-shaped cross-section as illustrated in FIGS. 3, 10, 13 and 14. FIG. 9 includes a cross-section of a portion of the protrusions 28I and 25, the screw 13I and the stud 27I. As illustrated in FIG. 9, the protrusion 28I and the stud 27I, the screw 13I and the protrusion 25, respectively, are opposed to each other with a gap therebetween in the free state in the embodiment. The protrusion 28I and the stud 27I, the screw 13I and the protrusion 25, respectively, may be structured to be in contact with each other in the free state, but it is preferable to provide a gap therebetween in the free state in terms of suppressing accumulation of manufacturing errors and abnormal noise.

With such structures, if the bottom wall 21a of the case 21 that is an outer housing bends toward the inside of the housing 3a (upward in FIG. 9) as a result of being pressed by fingers of a user, the protrusion 28I comes in contact with the opposed stud 27I (or the end of the screw 13I), the screw 13I comes in contact with the opposed protrusion 25, and thereby the bottom wall 21a is prevented from bending further. Thus, in the embodiment, the bending of the case 21 that is an outer housing can be suppressed by a relatively simple structure in which the protrusion 25 is provided to be opposed to the screw 13I and the protrusion 28I is provided to be opposed to the stud 27I (or the end of the screw 13I). Thus, according to the embodiment, the housing 3a is less easily deformed due to the external force applied toward the inside of the housing 3a. If the thickness of the case 21 is increased or the case 21 is reinforced, for example, in order to suppress the bending of the case 21 by increasing the rigidity, disadvantages may be caused such as an increase in weight of the case 21 and an increase in trouble in the manufacture. In the embodiment, however, the structures that can suppress the bending of the case 21 can be achieved without increasing so much weight and trouble in the manufacture. In the embodiment, the protrusion 28I corresponds to a first protrusion, and the protrusion 25 corresponds to a second protrusion. In the embodiment, the protrusion 28I, the protrusion 25, the stud 27I and the screw 13I constitute a displacement controlling mechanism 30 (see FIG. 9) that controls relative approach between the bottom wall 21a and the partition wall 22a.

As described above, in the embodiment, the stud 27I and the screw 13I are interposed between the protrusion 28I that is a first protrusion and the protrusion 25 that is a second protrusion, and the protrusion 28I and the protrusion 25 are not in direct contact with the board 12a. Therefore, deformation and damage of the board 12a are less likely to be caused as compared to a case where the protrusions 25 and 28I are in contact with the board 12a. In the embodiment, the stud 27I and the screw 13I correspond to interposed components, the stud 27I corresponds to a component-to-be-fixed, and the screw 13I corresponds to a fixing member. The interposed components are not limited to a combination of a stud and a screw, but may be structured as a rivet that is a fixing member and a through-hole that is a fixed member provided in a board.

In addition, in the embodiment, the stud 27I and the screw 13I, which is used to fix the SSD 24 that is the electronic component 15 to the board 12a, are used as interposed components opposed to the protrusions 25 and 28I. Therefore, the number of parts can be reduced, the mounting efficiency of the electronic components 15 on the board 12a can be prevented from being reduced and the trouble in the manufacture can be reduced as compared to a case where the interposed components are provided as exclusive members.

In the embodiment, the stud 27I and the screw 13I corresponding to the interposed components are different from the studs 27 and the screws 13 used to fix the pressing member 18 to the board 12a. Therefore, it is possible to suppress the influence of the external force applied via the protrusions 25 and 28I on functions and operations of the pressing member 18 and the CPU 16. Specifically, it is possible to prevent disadvantages such as reduction in the heat dissipation performance due to a decrease in the contact area of the heat receiving portion 17a of the heat pipe 17 and the radiator block 16a.

As can be seen in FIGS. 11 and 12, the protrusion 25 and the protrusion 28I are opposed to a portion in a circuit forming region inside of the circumferential edge of the board 12a in the embodiment. With such structures, it is possible to produce an effect of suppressing deformation of the housing 3a due to the protrusions 25 and 28I described above also at a position opposed to inside of the circuit forming region where a point of the board 12a to be fixed to the housing 3a is difficult to define, namely a region near the center of the bottom wall 21a of the case 21 in the embodiment.

Further, with such a structure in which the circumferential edge of the board 12a is fixed to the housing 3a (the inner plate 22 in the embodiment) at a plurality of positions (positions at which the through-holes 26A to 26E are provided in the embodiment; see FIG. 11), it is preferable to arrange the protrusion 25 and the protrusion 28I at positions nearer to the center of gravity Cg (see FIG. 11) of the board 12a than positions at which the protrusions are fixed. In this manner, it is possible to produce an effect of suppressing deformation of the housing 3a due to the protrusions 25 and 28I also in the region near to the center of the bottom wall 21a of the case 21. Such structures can also produce better effect in terms of suppressing the bending of the board 12a.

In particular, in the embodiment, the positions where the circumferential edge of the board 12a is fixed to the housing 3a are provided at positions where the board 12a or the screws 13A to 13E that are fixing members are interposed between the protrusions 28A to 28E that are third protrusions and the bosses 22dA to 22dE that are component-to-be-fixed, respectively, and thereby the deformation of the bottom wall 21a is suppressed by interference between the board 12a or the screws 13A to 13E and the protrusions 28A to 28E. Therefore, by arranging the protrusion 25 and the protrusion 28I to be opposed to a portion in a circuit forming region inside of the circumferential edge of the board 12a or arranging the protrusion 25 and the protrusion 28I to be opposed to positions nearer to the center of gravity Cg of the board 12a than positions at which the board 12a is fixed to the inner plate 22, it is possible to further distribute the positions at which the deformation of the bottom wall 21a is suppressed and to produce the effect of suppressing the deformation due to the protrusions 25 and 28 over a wider area of the bottom wall 21a.

In the embodiment, the studs 27, the screws 13 and the protrusions 25 and 28 are made of conductive materials and the studs 27 are connected to ground electrodes (not illustrated) of the board 12a, whereby the ground potentials become easily equalized by contact between the protrusions 25 and 28 and the studs 27 or the screws 13.

The mobile personal computer 1 is desirably more lightweight since a user may hold it for use. In addition, the housings 2a, 3a of the mobile personal computer 1 are required to have sufficient rigidity and strength to resist an external force applied by a user holding the housings. If the structure only includes the outer housing, it is difficult to balance such requirements in some cases. In the embodiment, however, it is structured such that the second body 3 is provided with the inner plate 22 that is an inner housing, and the parts of the second body 3 such as the board 12a and the display panel 9 are supported using the inner plate 22, whereby it is relatively easier to balance the reduction in weight and the improvement in rigidity.

Thus, in the embodiment, the board 12a is fixed to the inner plate 22 that is an inner housing. Accordingly, it is possible to suppress the influence of an external force applied to the outer housing by a user holding the housing 3a on the board 12a, the parts and the electronic components 15 as compared to a case where the board 12a is fixed to the outer housing.

In the embodiment, the front face 12c of the board 12a, which is a surface on which the CPU 16 that is a heat generator is mounted, is arranged on the side of the display panel 9, and the inner plate 22 that is an inner housing having heat conductivity is arranged between the board 12a and the display panel 9. Accordingly, the heat of the CPU 16 that is a heat generator acts less on the case 21 that is an outer housing, and the heat dissipating property is increased by heat transfer through the inner plate 22 by making the inner plate 22 of a heat conductive material such as a metal material, whereby the temperature in the housing 3a is more easily decreased.

In the embodiment, the bosses 21f, which are component-to-be-fixed for fixing the inner plate 22 that is an inner housing to the case 21 that is an outer housing, are provided at the corners of the case 21. Thus, the inner plate 22 can be fixed to the bosses 21f having relatively high rigidity of the case 21, and it is therefore possible to further suppress the influence of an external force applied to the outer housing by a user holding the housing 3a on the board 12a, the parts and the electronic components 15.

In the embodiment, the inner plate 22 that is an inner housing comprises the partition wall 22a and the brackets 22g protruding laterally from the partition wall 22a, and the brackets 22g are fixed to the bosses 21f that are component-to-be-fixed. Accordingly, by elastically deforming the brackets 22g, it is possible to further suppress the influence of an external force applied to the outer housing by a user holding the housing 3a on the board 12a, the parts and the electronic components 15.

If the number of positions at which the bottom wall 21a of the case 21 that is an outer housing and the board 12a are fixed is increased, for example, so as to suppress the bending of the bottom wall 21a toward the inside of the housing 3a, the mounting efficiency of the board 12a becomes lower and the weight is likely to increase due to an increase in the number of fixing members for the fixing. In the embodiment, however, since the deformation of the housing 3a can be suppressed by providing the protrusions 25 and 28 on the housing 3a as described above, fixing members or the like need not be added. Accordingly, it is possible to improve the rigidity of the housing 3a without increasing so much weight and trouble in the manufacture.

In addition, the mobile personal computer 1 according to the embodiment has a structure in which the board 12a is held from both the front and rear sides in the thickness direction between protrusions provided on one of the outer housing and the inner housing and protrusions or bosses provided on the other. Accordingly, the rigidity of the housing 3a is easily improved with a relatively simple structure. In addition, since the portions or parts for other use (namely the studs 27 and the screws 13 that are interposed components, the bosses 21f and the screws 13 that are board fixing members, and the like) are used to hold the board 12a, disadvantages such as an increase in weight due to additional parts and a reduction in the circuit mounting efficiency of the board 12a are less likely to occur.

A preferred embodiment of the invention has been described above. However, the invention is not limited to the above-described embodiment, and various modifications can be made. For example, while an example in which the invention is embodied as a notebook type mobile personal computer having two display screens is described in the above-described embodiment, the invention may be embodied as other electronic devices having at least one display screen, such as a computer (notebook type, desktop type), a personal digital assistant (PDA), a smartbook, a smartphone or a mobile phone terminal, having one display screen.

The specifications (such as systems, structures, shapes, materials, sizes, numbers, orientations, types and layouts) of the electronic device, display device, display screens, display panels, parts, board, housing, outer housing, inner housing, first protrusion, second protrusion, third protrusions, board fixing members, interposed components, fixing members, component-to-be-fixed, pressing member and the like may be modified as necessary in carrying out the invention.

According to the embodiment, it is possible to provide a mobile personal computer and an electronic device capable of improving the rigidity of a housing while preventing disadvantages from being caused.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A mobile personal computer comprising:
   a display panel comprising a display screen;
   a board assembly comprising a board and a first component mounted on the board;
   a housing configured to house the board assembly, comprising an outer housing forming an outline and an inner housing between the display panel and the board assembly;
   a first protrusion provided on the outer housing and protruding toward a first portion of the board assembly;
   a second protrusion provided on the inner housing and protruding toward the first portion of the board assembly, the second protrusion being positioned on an opposite side of the first protrusion with respect to the first portion of the board assembly;
   a third protrusion on the outer housing and protruding toward a second portion of the board assembly, the second portion being positioned nearer to an edge of the board than the first portion; and
   a displacement-controlling mechanism comprising a first fixing member and a second fixing member, the first fixing member being fixed to the board assembly and positioned between the first protrusion and the second protrusion, the first fixing member comprising a head portion and an end portion, the head portion of the first fixing member opposed to the second protrusion between the display panel and the board assembly, the end portion of the first fixing member being provided on the opposite side of the head portion of the first fixing member and being opposed to the first protrusion, the second fixing member being fixed to the board assembly and comprising a head portion, the head portion of the second fixing member being opposed to the third protrusion between the board assembly and the outer housing, the displacement-controlling mechanism being configured to control relative approach between the outer housing and the inner housing.

2. The mobile personal computer of claim 1, wherein the first portion is positioned in a circuit-forming region inside a circumferential edge of the board assembly.

3. The mobile personal computer of claim 2, wherein the first portion is positioned nearer to a center of gravity of the board than the second portion.

4. The mobile personal computer of claim 2, wherein a second component to which the first fixing member is fixed is provided at the first portion on the board assembly.

5. The mobile personal computer of claim 1, wherein the first portion is positioned closer to a center of gravity of the board than the second portion.

6. The mobile personal computer of claim 5, wherein a second component to which the first fixing member is fixed is provided at the first portion on the board assembly.

7. The mobile personal computer of claim 1, wherein a second component to which the first fixing member is fixed is provided at the first portion on the board assembly.

8. The mobile personal computer of claim 7, wherein
   a pressing member configured to press a heat pipe against the first component is fixed to the board by the first fixing member and the second component.

9. The mobile personal computer of claim 7, wherein
   when the outer housing is bent toward the inner housing, the first protrusion contacts the end portion of the first fixing member and the second protrusion contacts the head portion of the first fixing member.

10. An electronic device comprising:
    a display panel comprising a display screen;
    a board assembly comprising a board and a component mounted on the board;
    a housing comprising an outer housing forming an outline and an inner housing between the display panel and the board assembly, the housing being configured to house the board assembly;
    a first protrusion provided on the outer housing and protruding toward a first portion of the board assembly;
    a second protrusion provided on the inner housing and protruding toward the first portion of the board assembly, the second protrusion being positioned on an opposite side of the first protrusion with respect to the first portion of the board assembly;
    a third protrusion on the outer housing and protruding toward a second portion of the board assembly, the second portion being positioned nearer to an edge of the board than the first portion; and
    a displacement-controlling mechanism comprising a first fixing member and a second fixing member, the first fixing member being fixed to the board assembly and positioned between the first protrusion and the second protrusion, the first fixing member comprising a head portion and an end portion, the head portion of the first fixing member being opposed to the second protrusion between the display panel and the board assembly, the end portion of the first fixing member being provided on the opposite side of the head portion of the first fixing member and opposed to the first protrusion, the second fixing member being fixed to the board assembly and comprising a head portion, the head portion of the second fixing member being opposed to the third protrusion between the board assembly and the outer housing, the displacement-controlling mechanism being configured to control relative approach between the outer housing and the inner housing.

11. The electronic device of claim 10, wherein when the outer housing is bent toward the inner housing, the first protrusion contacts the end portion of the first fixing member and the second protrusion contacts the head portion of the first fixing member.

* * * * *